(12) United States Patent
Tsutsumida

(10) Patent No.: US 6,308,941 B1
(45) Date of Patent: Oct. 30, 2001

(54) LIQUID SEALED CYLINDRICAL-TYPE VIBRATION PREVENTING APPARATUS

(75) Inventor: Jyoji Tsutsumida, Komaki (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 09/523,995

(22) Filed: Mar. 13, 2000

(30) Foreign Application Priority Data

Mar. 5, 2001 (JP) .................................................. 11-092551

(51) Int. Cl.⁷ .......................................................... F16F 5/00
(52) U.S. Cl. ...................................... 267/140.12; 267/219
(58) Field of Search .......................... 267/140.12, 140.11, 267/219, 141, 141.1, 141.2; 248/562

(56) References Cited

U.S. PATENT DOCUMENTS

| | | | |
|---|---|---|---|
| 5,188,346 | * | 2/1993 | Hamada et al. ................. 267/140.12 |
| 5,221,077 | * | 6/1993 | Noguchi ........................... 267/140.12 |
| 5,261,649 | * | 11/1993 | Kato et al. ....................... 267/140.12 |
| 5,286,011 | * | 2/1994 | Strand .............................. 267/140.12 |
| 5,333,847 | * | 8/1994 | Kanda ............................. 267/140.12 |
| 5,370,376 | * | 12/1994 | Ishiyama ......................... 267/140.12 |
| 5,429,343 | * | 7/1995 | Maeno et al. ................... 267/140.12 |
| 5,558,316 | * | 9/1996 | Lee et al. ......................... 267/140.12 |
| 5,887,844 | * | 3/1999 | Fujiwara et al. ..................... 248/562 |
| 6,102,380 | * | 8/2000 | Tsutsumida ..................... 267/140.12 |

* cited by examiner

Primary Examiner—Robert J. Oberleitner
Assistant Examiner—Melody M. Burch
(74) Attorney, Agent, or Firm—Oblon, Spivak, McClelland, Maier & Neustadt, P.C.

(57) ABSTRACT

A liquid sealed cylinder vibration preventing apparatus including a main shaft metal fitting, an intermediate cylinder metal fitting outside the main shaft substantially coaxial and having windows facing each other in a diameter direction, a rubber elastic body between the main shaft and intermediate cylinder metal fittings to connect the main shaft and intermediate cylinder metal fittings and having a recess opened to each window, a first diaphragm on one of the windows and disposed in one of the recesses, an orifice forming member on the rubber elastic body, the orifice forming member forming a main liquid chamber, a sub liquid chamber, a first orifice passage and a second orifice passage, an outer cylindrical metal fitting outside the intermediate cylinder metal fitting substantially coaxial and having a communicate window communicated with atmosphere, and a second diaphragm held by the outer cylinder metal fitting and facing the second orifice passage.

12 Claims, 4 Drawing Sheets

LIQUID SEALED CYLINDRICAL-TYPE VIBRATION PREVENTING APPARATUS

BACKGROUND OF THE INVENTION

1. Field of the invention

This invention relates to a liquid sealed cylindrical-type vibration preventing apparatus suitably used for an engine mount of a vehicle, for example.

2. Related Art

Conventionally, when an engine of a vehicle which generates a vibration is mounted onto a body frame, an engine mount which supports the engine for preventing or absorbing the vibration has been used. One of such liquid sealed cylindrical-type vibration preventing apparatus is disclosed in Japanese Patent Laid-open (Koukai) No. 1-176827 and is shown in FIGS. 7 and 8.

This liquid sealed cylindrical-type vibration preventing apparatus is comprised of a pipe-shaped main-shaft metal fitting 101, a generally cylindrical rubber elastic (resilient) body 103, a first diaphragm 104 and a second diaphragm 107, an annular orifice forming member 105, and an outer cylindrical metal fitting 106.

In detail, the rubber elastic body 103 is attached outside the main-shaft metal fitting 101 and has a pair of opened recesses 135 and 136 on an outer surface thereof. The first and second diaphragms 104 and 107 are formed integral with the rubber elastic body 103 and is disposed in one recess 135 circumferentially. The orifice forming member 105 is mounted outside the rubber elastic body 103 and covers opened portions of each recess 135 or 136 so that a main liquid chamber 155 in which a liquid (L) is filled and sealed is formed in another recess 136, and a first sub liquid chamber 156a and a second sub liquid chamber 156b are formed between the orifice forming member 105 and the first and second diaphragms 104 and 107. The orifice forming member 105 is also formed, at an outer peripheral surface thereof, a first orifice passage 157 which communicates the main liquid chamber 155 with the first sub liquid chamber 156a and a second orifice passage 158 which communicates the main liquid chamber 155 with the second sub liquid chamber 156b. The outer metal fitting 106 is coaxially disposed outside the orifice forming member 105.

This liquid sealed cylindrical-type vibration preventing apparatus is mounted onto the vehicle, by attaching the main-shaft metal fitting 101 to a mount portion of one of the vehicle body side and engine side by bolts etc., and by engaging the outer-cylinder metal fitting 101 under pressure to another mount portion. Upon the mounting, the vibration preventing apparatus is directed so that the main liquid chamber 155, is located at an upward portion or a downward portion through which the main vibration of the engine is transmitted.

When the vibration orthogonal to the main-shaft metal fitting 101 is applied between the main-shaft metal fitting 101 and the outer cylinder metal fitting 106 in this condition, the volume of the main liquid chamber 155 varies due to the elastic deformation of the rubber elastic body 103, so that the liquid (L) flows between the main liquid chamber 156 and the first and second sub liquid chambers 156a and 156b via the first and second orifice passages 157 and 158. Upon the liquid-flowing, the vibration of the engine shake (about 10 Hz) can be effectively reduced by a liquid pillar resonance operation of the liquid (L) which flows in the first orifice passage 157. Also, the idle vibration (about 25 Hz) can be effectively reduced by a liquid pillar resonance operation of the liquid (L) which flows in the second orifice passage 158.

Thus, this vibration preventing apparatus can reduce the two kinds of vibration of different, relatively small frequencies and of which difference is relatively small, by the liquid pillar resonance operation by the liquid (L) which flows in the first and the second orifice passages 157 and 158.

By the way, to obtain the aimed frequency for tuning by selecting the cross-section area and the passage length of the first and second orifice passages 157 and 158, and the spring rigidity of the first and second diaphragms 104 and 107, the rubber elastic body 103 and the orifice forming member 105 which can be adapted to such tuning specification should be prepared and assembled. Here, the resonance frequency can be set higher when the cross-section area of the first and second orifice passages 157 and 158 is selected larger, the passage-length of the first and second orifice passages 157 and 158 is selected shorter and the spring rigidity of the first and second diaphragms 104 and 107 is selected higher or larger. Accordingly, the frequency is adjusted by preparing the rubber elastic body 103 and the orifice forming member 105 having the construction adapted to the required tuning specification and assembling them.

However, the recent diversification of the required specification needs various kinds of the construction members. Preparing the construction members for each specification is disadvantageous in the manufacturing cost and the administration.

In addition, there is a case where the idle vibration of about 25 Hz and a low-speed confine noise of about 80 to 100 Hz should be reduced, instead of the engine shakes (10 Hz) and the idle vibration (20 Hz). It is noted that the low-speed confine noise is the vibration which has the relatively higher frequency different from that of the idle vibration. For this reason, the conventional liquid sealed cylindrical-type vibration preventing apparatus which has the above mentioned construction can be hardly turned to reduce the idle vibration and the low-speed confine noise.

SUMMARY OF THE INVENTION

The present invention is made in view of the above circumstances in the conventional art, and therefore has an object to provide the liquid sealed cylindrical-type vibration preventing apparatus which has the construction convenient to be tuned to the frequency which can reduce two kinds of vibrations having the different frequency area (for example, the idle shake and low-speed confine noise), and which can be tuned easily.

In a liquid sealed cylindrical-type vibration preventing apparatus of the present invention, an outer cylindrical metal fitting is disposed radially outward of an intermediate cylindrical metal fitting disposed radially outward of a central main shaft (inner cylindrical metal fitting), width and length of a first orifice passage and a second orifice passage formed on an orifice forming member, and spring rigidity of a first diaphragm and a second diaphragm is improved. In detail, the vibration preventing apparatus is comprised of 1) a main shaft metal fitting, 2) an intermediate cylinder metal fitting disposed outside the main shaft substantially coaxial therewith and having a pair of windows facing to each other in a diameter direction, 3) a rubber elastic or resilient body disposed between the main shaft metal fitting and the intermediate cylinder metal fitting to connect the main shaft metal fitting and the intermediate cylinder metal fitting to each other and having a pair of recesses opened to each of the windows, 4) a first diaphragm held on a periphery of one window of the intermediate cylinder metal fitting and being disposed in one recess of the rubber elastic body, 5) an orifice forming member mounted on an outer periphery of the rubber elastic body, the orifice forming member forming a main liquid chamber and a sub liquid chamber between the orifice forming member, and the other recess and the first diaphragm respectively, and forming on an outer peripheral surface a first orifice passage communicating with the main liquid chamber and the sub liquid chamber, and a second orifice passage extending from the main chamber, 6) an outer cylindrical metal fitting disposed outside the intermediate cylinder metal fitting substantially coaxial therewith, and having a communicate window communicated with an atmosphere, and 7) a second diaphragm held by the outer cylinder metal fitting at an periphery of the communicate window and facing to the second orifice passage.

According to the liquid sealed cylindrical-type vibration preventing apparatus of the present invention, when the vibration in the direction orthogonal to the main shaft metal fitting is applied between the main shaft metal fitting and the outer cylinder metal fitting, the volume of the main liquid chamber is changed due to the elastic deformation of the rubber elastic body. Thus, the liquid which flows between the main liquid chamber and the sub liquid chamber via the first orifice passage performs the liquid pillar resonance operation to reduce the vibrations having the predetermined (relatively low) frequency, while the liquid which flows from the main liquid chamber to the second diaphragm faced to the second orifice passages performs the liquid pillar resonance operation to reduce the vibrations having the predetermined (relatively high) frequency, by the peculiar construction of the vibration preventing apparatus. In this way, two kinds of the vibrations which have different frequencies can be decreased effectively by the liquid pillar resonance operation of the liquids which flow in the first and second orifice passages.

In the liquid sealed cylindrical-type vibration preventing apparatus of the present invention, since the second diaphragm opposing to the second orifice passage is attached to the periphery of the communicate window of the outer cylindrical metal fitting, a disposing location of the second diaphragm can be suitably selected in view of the disposed location of the main liquid chamber and the sub liquid chamber. In this way, the substantial passage length of the second orifice passage extending from the main liquid chamber to the second diaphragm can be set shorter, while the passage length of the first orifice passage extending from the main liquid chamber to the sub liquid chamber can be set longer, which are convenient to be tuned in two different frequencies.

In addition, the second diaphragm is attached to the outer cylindrical metal fitting, so the disposing location of the second diaphragm can be easily shifted or adjusted circumferentially by attaching the outer cylindrical metal fitting to the second diaphragm in a circumferentially shifted or rotated condition. Thus, the passage length of the second orifice passage can be changed easily, to perform the frequency tuning of the second orifice passage easily.

Also, in the liquid sealed cylindrical-type vibration preventing apparatus of the present invention, since the first diaphragm is disposed in one recess of the rubber elastic body independently, the first diaphragm of large area can be used to have low spring rigidity easily. Thus, the spring rigidity difference between the first and second diaphragms can be set larger, which is convenient to tune the frequencies of the first and second orifices in two different values.

As mentioned above, the liquid sealed cylindrical-type vibration preventing apparatus has the construction which is convenient to be tuned for decreasing the two vibrations which have different frequency bands, and can perform the tuning easily.

The present invention can have various modifications or deformations.

The intermediate cylindrical metal fitting can include a pair of ring portions located at axial both ends, and two bridge portions which bridges both the ring portions and form two windows together with the both ring portions.

The rubber elastic body can include a pair of annular side wall portions located at axial ends, and a pair of arm-like partition portions which divide a space formed between the both annular side wall portions and form two recessed portions which are opened at an outer peripheral surface thereof together with the paired annular side wall partition portions. Also, the paired annular side wall portions can be connected to each of ring portions of the intermediate cylindrical metal fitting, and the paired arm-like partition portions can be connected to each of the bridge portions of the intermediate cylindrical metal fitting. These are convenient to form the main liquid chamber and the sub liquid chamber, and to be elastically deformed when the load is applied.

The first diaphragm can formed integral with the rubber elastic body so that an outer periphery are held by the intermediate cylinder metal fitting and an intermediate portion is contacted with the intermediate cylinder metal fitting. This makes the forming of the first diaphragm easy.

The orifice forming member can include a cylindrical bottom wall portion located at axially intermediate position and a pair of annular side wall portions located at axially end position thereof. An inner peripheral surface of the cylindrical bottom wall portion forms a part of a wall surface forming the main liquid chamber and the sub liquid chamber. The cylindrical bottom wail portion and the pair of annular side wall portions form the first orifice passage and the second orifice passage both extending in the circumferential direction along an outer peripheral surface of the bottom wall portion. This makes the forming of the first and second orifice passages easy.

The second orifice passage can have a passage width larger than a half of an axial width of the other window of the intermediate cylinder metal fitting. This can make the cross-section area of the second orifice passage larger, which is convenient for tuning in the high frequency. The first orifice passage and the second orifice passage can extend oppositely in a circumferential direction of the orifice forming member, and the first orifice passage extending from the main liquid chamber to the sub liquid chamber has a passage length longer than that of the second orifice passage extending from the main liquid chamber to the second diaphragm. This can generate the frequency difference between the first and second orifice passages.

By attaching the outer cylinder metal fitting to the rubber elastic member or the intermediate cylindrical metal fitting with rotated condition relative to the rubber elastic body in the circumferential direction, position of the second diaphragm relative to the position of the main and sub liquid chambers can be changed. Thus, the substantial passage length of the second orifice passage from the main liquid chamber to the second diaphragm can be set shorter.

In addition, by attaching the second diaphragm to the outer cylindrical metal fitting in the state where the outer cylindrical metal fitting is rotated to the rubber elastic member or the intermediate cylindrical metal fitting, the relative position of the second diaphragm relative to the main and sub liquid chambers can be shifted circumferential. Accordingly, the passage length of the second orifice passage can be set easily to tune the resonance frequency easily.

The second diaphragm can have the spring rigidity larger than that of the first diaphragm. This makes the resonance frequency of the second orifice passage higher than that of the first orifice passage.

PREFERRED EMBODIMENT OF THE INVENTION

Figure 1:
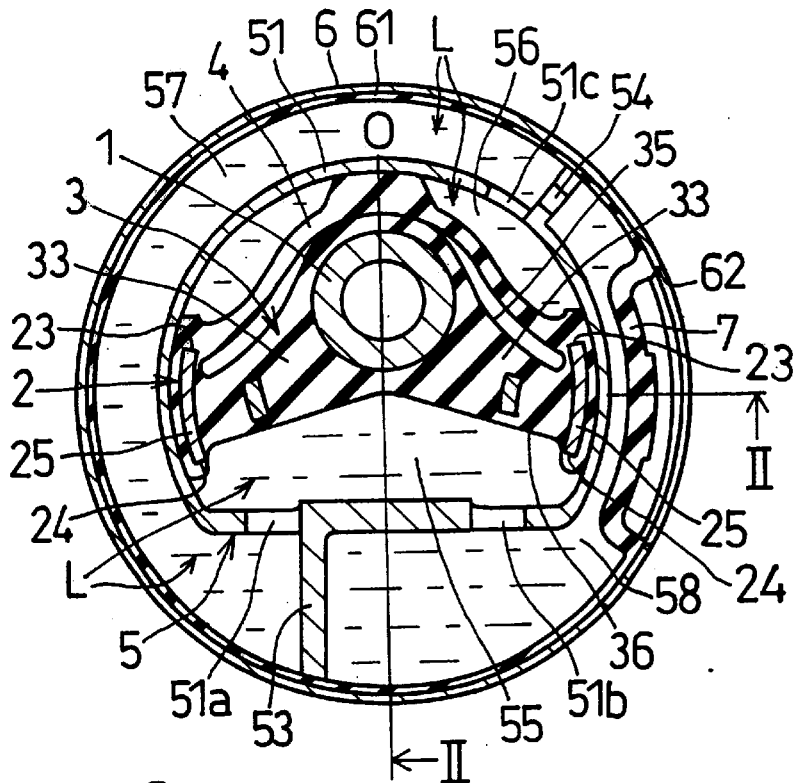
FIG. 1 is a cross-sectional view of a liquid sealed cylindrical-type vibration preventing apparatus according to one embodiment of the present invention in direction orthogonal to a main shaft, and corresponds to a cross-sectional view along line I—I in FIG. 2.

Hereinafter, a preferred embodiment of the present invention will be explained with reference to attached drawings. However, this embodiment should not be interpreted to limit the present invention.

As shown in FIGS. and 2, the liquid sealed cylindrical-type vibration preventing apparatus of the preferred embodiment is comprised of a main-shaft metal fitting 1 made of a metallic pipe and disposed at a central portion of the vibration preventing apparatus, an intermediate cylinder metal fitting 2 disposed coaxially outside the main-shaft metal fitting 1 and having a pair of windows 23 and 24, a rubber elastic body 3 connecting the main-shaft metal fitting 1 and the intermediate cylinder metal fitting 2 integrally and having a pair of recesses 35 and 36, a first diaphragm 4, an outer periphery of which is held by a part of the intermediate cylinder metal fitting 2, an orifice forming member 5 mounted on an outer periphery of the rubber elastic body 3 and forming a main liquid chamber 55 and a sub liquid chamber 56 inside thereof and forming a first orifice passage 57 and a second orifice passage 58 on an outer peripheral surface thereof, an outer cylinder metal fitting 6 disposed coaxially outside the intermediate cylinder metal fitting 2 and having a window 62 communicated with an atmosphere, and a second diaphragm 7 an outer periphery of which is held by a part of the outer cylinder metal fitting 6. Detail of each element will be explained below.

The intermediate cylinder metal fitting 2 includes a pair of ring portions 21 disposed at both axial end portions thereof, and two bridge portions 25 disposed at an axially intermediate portion thereof. The bridge portions 25 are located apart from each other in the circumferential direction and bridges the both ring portions 21, to form two windows 23 and 24 which have the same opened width in the circumferential direction together with the ring portions 21. Although this intermediate cylinder metal fitting 2 is eccentric to the main-shaft metal fitting 1 when the vibration preventing apparatus is not mounted onto the vehicle, it becomes substantially coaxial when the vibration preventing apparatus is mounted onto the vehicle.

The rubber elastic body 3 is vulcanizedly formed between the main-shaft metal fitting 1 and the intermediate cylinder metal fitting and connects them each other. The rubber elastic body 3 includes a pair of annular side wall portions 31 formed at both axial ends thereof corresponding to the ring portion 21 of the intermediate cylinder metal fitting 2, and a pair of arm-like partition portions disposed at an axially intermediate portion corresponding to the bridge portions 25 to connect the bridge portions 25 and the main-shaft metal fitting 1 and to divide an annular space between the both annular side wall portions 31. As a result, on an outer periphery surface of the rubber elastic body 3, two recesses 35 and 36 defined by the both annular side wall portions 31 and both arm-like partition portions 33 opened at the windows 23 and 24 of the intermediate cylinder metal fitting 2 and having same opened circumferential width are formed. The recesses 35, 36 extend only in axially intermediate portion thereof, and one of the recesses 35 has larger circumferential dimension than that of the other recess 36. In the annular side wall portions 31, restrain members 31a for restraining the annular side wall portion s 31 are dipped at portions corresponding to the recess 36.

The first diaphragm 4 is made of a rubber film and has a dome shape which covers the arm-like partition portions 33. Outer periphery of the first diaphragm 4 is vulcanizedly attached to the periphery of one of the windows 23 and is connected to the arm-shaped partition portions 33 of the rubber elastic body 3 integrally. Thus, the first diaphragm 4 can expand/shrink in the recess 35 of the rubber elastic body 3.

The orifice forming member 5 is comprised of, as shown in FIGS. 3 to 6, a bottom wall portion 51, a pair of side wall portions 52, a first partition (divide) wall 53 and a second partition (divide) wall 54. The bottom wall portion 51 includes an arch portion 50a and a flat portion 50b connecting both ends of the arch portion 50a, and has a substantially cylindrical shape. The both side wall portions 52 extend radially outwardly from the both ends of the bottom wall portion 51 and have a ring-shape. The first partition wall 53 is shifted to ward one side (left side in FIG. 3) relative to a line X-Y which connects a center of the bottom wall portion 51, and an intermediate portion of the flat portion 50b to be parallel to the line X-Y, and partitions a space between both side wall portions 52 circumferentially.

On the other hand, the second partition wall 54 is located at the right side of the line X-Y and is provided at position spaced by about half circle in the circumferential direction extending radially outwardly, and partitions the space between the both side wall portions 52 circumferentially. The first and second partition walls 53 and 54 are abutted to the inner periphery surface of the seal rubber layer 61. On the flat portion 50b of the bottom wall portion 51, first and second rectangular communicate holes 51a and 51b which penetrate in the inner/outer direction are formed at both sides of the first partition wall 53, and a third rectangular communicate hole 51c which penetrate in the inner/outer direction is formed at a side of the first communicate hole 51a. The orifice forming member 5 has an axial length shorter than that of the intermediate cylindrical metal fitting 2, and equivalence to the space between the both annular side wall portions 31 of the rubber elastic body 3.

Figure 2:
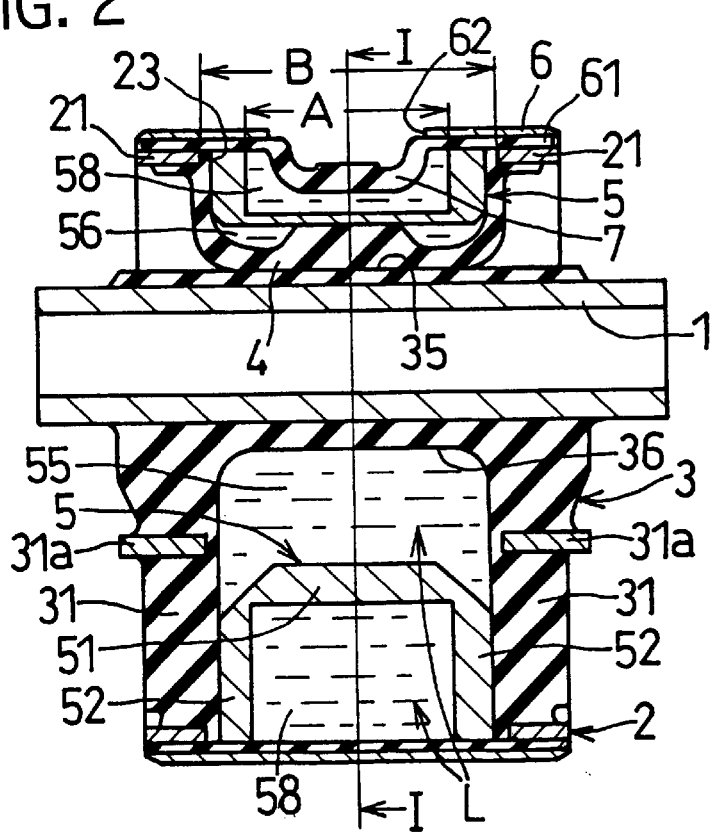
FIG. 2 is a cross-sectional view of a liquid sealed cylindrical type vibration preventing apparatus according to above embodiment in an axial direction of the main shaft, and corresponds to a cross-sectional view along line II-O-II in FIG. 1.
Figure 3:
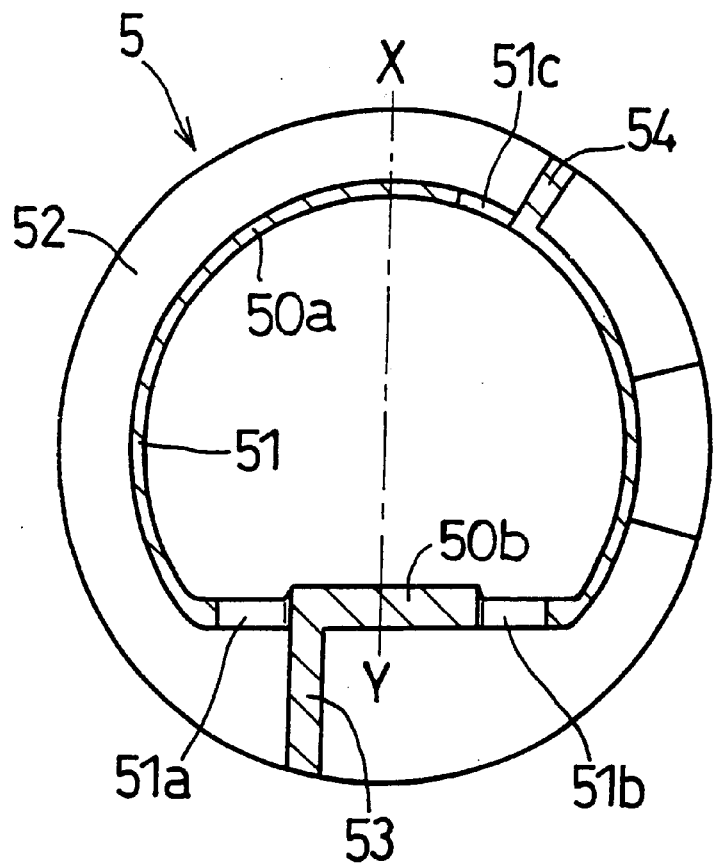
FIG. 3 is a cross-sectional view of the orifice forming member in the above embodiment in direction orthogonal to the main shaft, and corresponds to a cross-sectional view along a line III—III in FIG. 4.
Figure 4:
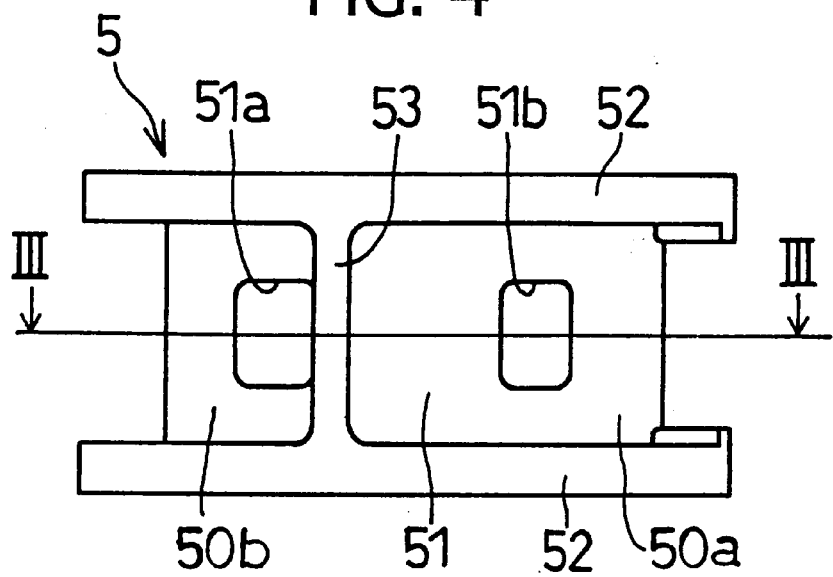
FIG. 4 is a bottom view of the above orifice forming member.
Figure 5:
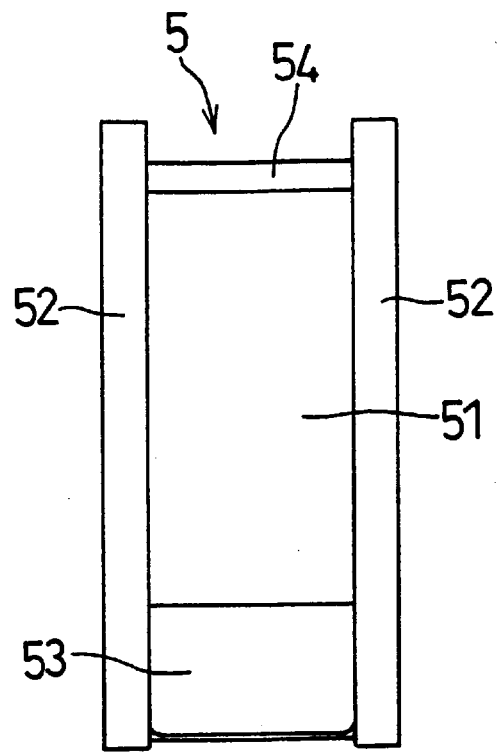
FIG. 5 is a left side view of the above orifice forming member.
Figure 6:
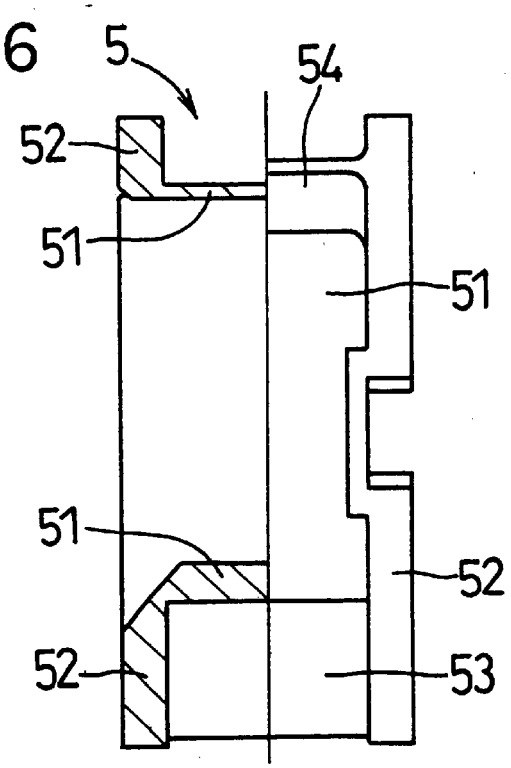
FIG. 6 is a front view of the above orifice forming member in which a left half is shown in cross-sectional view.
Figure 7:
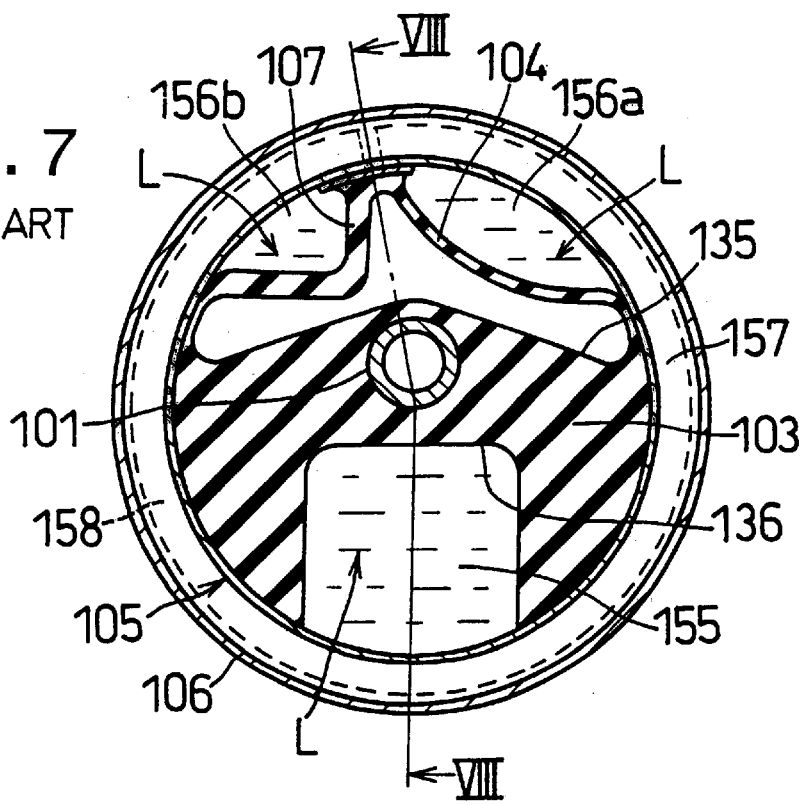
FIG. 7 is a cross-sectional view of a conventional liquid sealed cylindrical-type vibration preventing apparatus in direction orthogonal to a main shaft.
Figure 8:
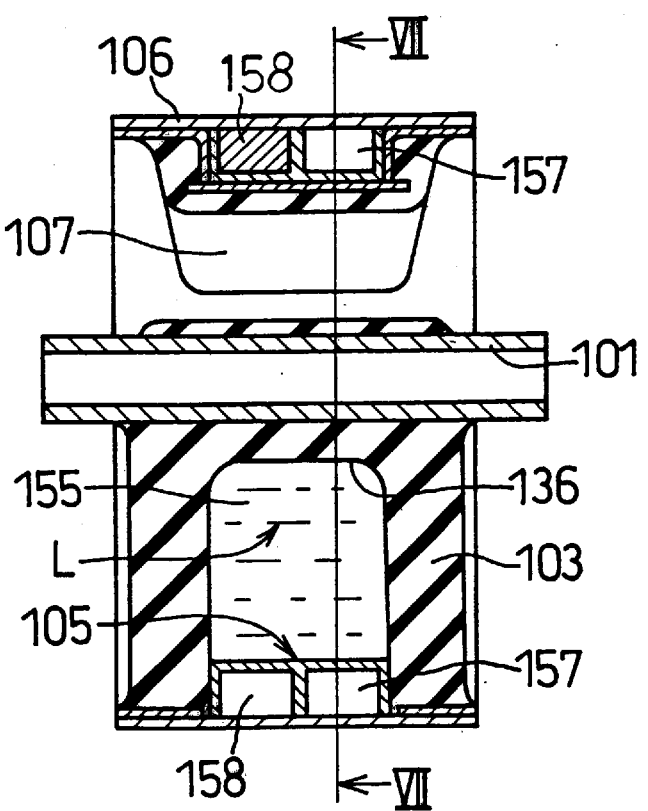
FIG. 8 is a cross-sectional view of the above conventional liquid sealed cylindrical-type vibration preventing apparatus in an axial direction of the main shaft, and corresponds to a cross-section view along line VII—VII in FIG. 7.

As shown in FIGS. 1 and 2, the orifice forming member 5 is fitted to an outer periphery of the rubber elastic body 3 so that the flat portion 50b of the bottom wall portion 51 engages with the recess 36 of the rubber elastic body 3, and the arch portions 50a abuts onto a part of the outer peripheral surface of the arm-shaped partition portion 36 and a part of the outer peripheral surface of the first diaphragm 4. Thus, the openings of the recesses 35 and 36 are closed by the orifice forming member 5, so that a main liquid chamber 55 for the liquid (L) is formed between the flat portion 50b and the recess 36, while a sub liquid chamber 56 for the liquid (L) and having substantially the same peripheral length as that of the main liquid chamber 55 is formed between the arch portion 50a and the first diaphragm 4.

At the outer periphery of the orifice forming member 5, a first orifice passage 57 and a second orifice passage 58 are formed. The first orifice passage 57 is extended in the circumferential direction from a first communicate hole 51a communicated with the main liquid chamber 57 to a third communicate hole 51c communicated with the sub liquid chamber 56. The second orifice passage 58 is extended in the direction opposite to the first orifice passage 57 from a second communicate hole 51b communicated with the main liquid chamber 55 to a position adjacent to the second partition wall portion 54 (a second diaphragm 7 to be explained later), and is shorter than the first orifice passage 57.

As shown in FIG. 1, the second orifice passage 58 has a passage width (A), more than the half of an axial width (B) of the window 23 of the intermediate cylinder metal fitting 2, thereby broadening the cross-section area. Here, the first orifice passage 57 has the passage width equivalent to the above passage width (A).

Outer peripheral openings of the first and second orifice passages 57 and 58 are covered by the outer cylinder metal fitting 6 and the second diaphragm 7 mounted onto the orifice forming member 5, as will be explained later. In the first and second orifice passages 57 and 58, and the main and sub liquid chambers 56 and 57, a non-compressive liquid (L) such as a water or a glycol is sealed.

As shown in FIGS. 1 and 2, an outer cylinder metal fitting 6 made of a metal and having a cylindrical shape is covered by a seal rubber 61 on an inner peripheral surface. The outer cylinder metal fitting 6 is attached to the intermediate cylinder metal fitting 2 and the orifice forming member 5 to be coaxial therewith by drawing it after engaged with outside them. The outer cylinder metal fitting 6 is provided with a communicate window 62 formed by cutting a portion thereof adjacent to the second partitions wall 54 located intermediately in the axial direction and corresponding to a terminal end of the second orifice passage 58 into a rectangular shape. The liquid (L) is sealed in t he main and sub liquid chambers 55 and 56 by mounting the outer cylinder metal fitting 6 to the intermediate cylinder metal fitting 2 and the like in the condition where they are dipped into the liquid (L) to be sealed into the main and sub liquid chambers 55 and 56.

The second diaphragm 7 is formed by a rubber film integral with the seal rubber film 61 and has a dome shape. The second diaphragm 7 is disposed within a second orifice passage 58 formed between the arch portion 50a of the orifice forming member 5 and the outer cylinder metal fitting 6, and an outer periphery of which is vulcanizedly attached around the communicate window 62 of the outer cylinder metal fitting 6 to seal the communicate window 62. In this way, the second diaphragm 7 has the spring rigidity higher than that of the first diaphragm 4.

The above mentioned liquid sealed cylindrical-type vibration preventing apparatus is tuned to reduce the idle vibration (about 25 Hz) by suitably selecting the cross-section area of the first orifice passage 57, the passage length of the first orifice passage 57 from the first communicate hole 51a to the third communicate hole 51c, and the spring rigidity of the first diaphragm 4. The vibration preventing apparatus is also tuned to reduce the low-speed confine noise (about 80 to 100 Hz) by suitably selecting the cross-section area of the second orifice passage 58, the passage length of the first orifice passage 58 from the second communicate hole 51b to the second diaphragm 7, and the spring rigidity of the second diaphragm 7.

The liquid sealed cylindrical-type vibration preventing apparatus is mounted onto the vehicle by attaching the main-shaft metal fitting 1 to an attach portion of one of a vehicle body and an engine by the bolts and the like, and by engaging the outer cylinder metal fitting 6 with another attaching portion under pressure so that the main liquid chamber 55 is located upwardly or downwardly to receive the main vibration of the engine transmitted. The window 62 on the outer cylindrical metal fitting 6 is opened to the atmosphere. When the vibration preventing apparatus is mounted on the vehicle, the rubber elastic body 3 is elastically deformed by the gravity of the engine to shift the main-shaft metal fitting 1 in one direction (downward direction in FIGS. 1 and 2) to be coaxial with the outer cylinder metal fitting 6.

In this condition, when the vibration, in a direction orthogonal to the main-shaft metal fitting 1 is applied between the two metal fittings 1 and 6, a volume of the main liquid chamber 55 changes due to the elastic deformation of the rubber elastic body 3, so that the liquid (L) flows between the main liquid chamber 55 and the sub liquid chamber 56 through the first communicate hole 51a, the first orifice passage 57 and the third communicate hole 51c. Upon the flowing, the liquid reduces the idle vibration effectively by the liquid-pillar resonance operation thereof. When the liquid (L) flows into the sub liquid chamber 56 through the third communicate hole 51c and flows out therefrom, the first diaphragm 4 expands and shrinks in the recess 35 to change the volume of the sub liquid chamber 56 corresponding to the volume change of the main liquid chamber 55, thereby allowing the flow of the liquid (L).

At the same time, the liquid (L) which flows between the main liquid chamber 55 and the second diaphragm 7 through the second communicate hole 51b and the second orifice passage 58 reduces the low-speed confine noise effectively by the liquid-pillar resonance operation thereof. When the liquid (L) flows into the second orifice passage 58 through the second communicate hole 51b and flows out therefrom, the second diaphragm 7 expands and shrinks toward the communicate window 62 corresponding to the volume change of the main liquid chamber 55, thereby allowing the flow of the liquid (L).

As mentioned above, in the liquid sealed cylindrical-type vibration preventing apparatus, the disposed location (area)

of the first diaphragm 4 which forms the sub liquid chamber 56 is extended in the circumferential direction and in the axial direction to the extent equivalent to that of the main liquid chamber 55 so that the spring rigidity of the first diaphragm 4 can be set low easily, the both cross-sectional areas of the first and second orifice passages 57 and 58 are set larger, and the second diaphragm 7 having the spring rigidity larger than that of the first diaphragm 4 is disposed in the second orifice passage 58. As the result, the allowed space of the vibration preventing apparatus is effectively used and the liquids (L) flowing in the first and second orifice passages 57 and 58 perform the liquid resonance operation sufficiently in good balance, so that both the idle vibration and the low-speed confine noise which have different frequency areas can be reduced sufficiently.

In detail, the first diaphragm 4 is formed so that the outer periphery thereof is attached to the periphery of one of the windows 23 of the intermediate cylindrical metal fitting 2, and is connected to the arm-like partition portions 33 integrally, to be expanded and shrunk within the recess 35 of the rubber elastic body 3. In addition, the sub liquid chamber 56 formed by the first diaphragm 4 has the circumferential length equivalent to that of the main liquid chamber 55. As the result, the first diaphragm 4 disposed in the large sub liquid chamber 56 has large or broad extension, so that the spring rigidity thereof can be set small.

In addition, the cross-section areas of the first and second orifice passages 57 and 58 are set larger by extending the axial width of the first and second orifice passages 57 and 58. That is, the passage width (A) of the second orifice passage 58 is selected longer than the half of the axial width (B) of the window 23 of the intermediate cylinder metal fitting 2, which is convenient to obtain the high tuning frequency. On the other hand, although the axial width of the first orifice passage 57 is selected to be same as that of the second orifice passage 58, it can be selected smaller to make the cross-section area small for obtaining the low tuning frequency.

Further, the second diaphragm 7 facing to the second orifice passage 58 is attached to the periphery of the window 62 of the outer cylinder metal fitting 6, and has the axial width and the circumferential length shorter than that of the first diaphragm 4. Accordingly, the second diaphragm 7 has the spring rigidity higher than that of the first diaphragm 4. In this way, the idle vibration and the low-speed confine noise can be reduced with utilizing the allowed space.

Further, the disposing location of the second diaphragm 7 attached to the periphery of the window 62 of the outer cylinder metal fitting 6 can be changed suitably, independent from the rubber elastic body 3. It is noted that the circumferential position of the second diaphragm 7 in the second orifice passage 58 can be selectively changed in view of the relative position to the main and sub liquid chambers 55 and 56. In this way, the substantial passage length of the second orifice passage 58 extended from the main liquid chamber 55 to the second diaphragm 7 can be set shorter to be tuned in the high frequency. Thus, the passage length of the second orifice passage 58 can be set easily to perform the tuning easily, and the passage length of the first orifice passage 57 which is extended from the main liquid chamber 55 to the sub liquid chamber 56 can be set longer to be tuned in the low frequency than that of the second orifice passage 58. Accordingly, the vibration preventing apparatus has the construction which is very convenient to tune the first and second orifice passages 57 and 58 for reducing the idle vibration and the low-speed confine noise.

In detail, the second partition wall 54 of the orifice forming member 5 at which the second orifice passage 58 terminates is offset rightwardly from the center line X-Y, the length difference between the longer second orifice passage 58 and the shorter first orifice passage 57 is set larger. Under such passage length relation, no member is disposed in the first orifice passage 57, but the second diaphragm 7 attached to the outer cylindrical metal fitting 6 is provided in the second orifice passage 58 independent from the rubber elastic body 3. Accordingly, when the outer cylindrical metal fitting 6 is attached to the intermediate metal fitting 2 and the rubber body 3, it can be attached to them after rotating circumferentially, so that the disposed location of the second diaphragm 7 in the circumferential direction can be selected in view of the relative location to the main and sub liquid chambers 55 and 56.

In this way, the passage length of the second orifice passage 58 can be suitably set easily for tuning. In addition, by rotating the outer cylindrical metal fitting 6 circumferentially when it is attached to the intermediate cylindrical metal fitting 2, the disposing position of the second diaphragm 7 is easily shifted in the circumferential direction, whereby the passage length of the second orifice passage 58 can be set and changed easily.

What is claimed is:

1. A liquid sealed cylinder vibration preventing apparatus, comprising:
   a main shaft metal fitting;
   an intermediate cylinder metal fitting disposed outside said main shaft substantially coaxial therewith and having a pair of windows facing to each other in a diameter direction;
   a rubber elastic body disposed between said main shaft metal fitting and said intermediate cylinder metal fitting to connect said main shaft metal fitting and said intermediate cylinder metal fitting to each other and having a recess opened to each window of the pair of windows;
   a first diaphragm held on a periphery of one of the pair of windows of said intermediate cylinder metal fitting and being disposed in the windows the recesses of said rubber elastic body;
   an orifice forming member mounted on an outer periphery of said rubber elastic body, said orifice forming member forming a main liquid chamber between said orifice forming member and the recesses and a sub liquid chamber between said orifice forming member and said first diaphragm, and forming on an outer peripheral surface a first orifice passage communicating with the main liquid chamber and the sub liquid chamber, and a second orifice passage extending from the main chamber;
   an outer cylindrical metal fitting disposed outside said intermediate cylinder metal fitting substantially coaxial therewith, and having a communicate window communicated with an atmosphere; and
   a second diaphragm held by said outer cylinder metal fitting at a periphery of the communicate window and facing the second orifice passage.

2. A liquid sealed cylinder vibration preventing apparatus according to claim 1, wherein said intermediate cylinder metal fitting includes a pair of ring portions located at both axial ends, and two bridge portions which bridge the pair of ring portions and form the pair of windows together with the two bridge portions.

3. A liquid sealed cylinder vibration preventing apparatus according to claim 1, wherein said rubber elastic body includes a pair of annular side wall portions located at axial ends, and a pair of partition portions which divide a space formed between the both annular side wall portions and form two recessed portion which are opened at an outer peripheral surface thereof together with the pair of partition portions.

4. A liquid sealed cylinder vibration preventing apparatus according to claim 3, wherein the intermediate cylindrical metal fitting includes a pair of ring portions at both axial ends and two bridge portions which bridge the pair of ring portions, and the pair of annular side wall portions of said rubber elastic body are connected to each ring portion of the pair of ring portions of the intermediate cylindrical metal fitting, and the pair of partition portions portion are connected to each of the bridge portions of the intermediate cylindrical metal fitting.

5. A liquid sealed cylinder vibration preventing apparatus according to claim 1, wherein said first diaphragm is formed integral with said rubber elastic body so that an outer periphery is held by said intermediate cylinder metal fitting and an intermediate portion is contacted with said rubber elastic body.

6. A liquid sealed cylinder vibration preventing apparatus according to claim 1, wherein said orifice forming member includes a cylindrical bottom wall portion located at an axially intermediate position and a pair of annular side wall portions located at an axially end position thereof.

7. A liquid sealed cylinder vibration preventing apparatus according to claim 6, wherein the cylindrical bottom wall forms a part of a wall forming the main liquid chamber and the sub liquid chamber.

8. A liquid sealed cylinder vibration preventing apparatus according to claim 6, wherein the cylindrical bottom wall portion and the pair of annular side wall portions form the first orifice passage and the second orifice passage both extending in a circumferential direction along an outer peripheral surface of the bottom wall portion.

9. A liquid sealed cylinder vibration preventing apparatus according to claim 1, wherein the second orifice passage has an axial passage width larger than a half of an axial width of one of the windows of the pair of windows of said intermediate cylinder metal fitting.

10. A liquid sealed cylinder vibration preventing apparatus according to claim 1, wherein the second orifice passage extends oppositely to the first orifice passage in a circumferential direction of said orifice forming member, and having a circumferential passage length longer than that of the first orifice passage.

11. A liquid sealed cylinder vibration preventing apparatus according to claim 1, wherein said outer cylinder metal fitting is attached to said rubber elastic body by adjusting a circumferential position thereto so that a relative circumferential position of said second diaphragm to the main liquid chamber and the sub liquid chamber is adjusted.

12. A liquid sealed cylinder vibration preventing apparatus according to claim 1, wherein said second diaphragm has a larger spring rigidity than said first diaphragm.

* * * * *

UNITED STATES PATENT AND TRADEMARK OFFICE
CERTIFICATE OF CORRECTION

PATENT NO. : 6,308,941 B1
DATED : October 30, 2001
INVENTOR(S) : Tsutsumida

It is certified that error appears in the above-identified patent and that said Letters Patent is hereby corrected as shown below:

<u>Title page,</u>
Item [30], the Foreign Application Priority information should read:

-- [30]   Foreign Application Priority Data

Mar. 31, 1999    (JP) ................................ 11-092551 --

Signed and Sealed this

Second Day of July, 2002

*Attest:*

*Attesting Officer*

JAMES E. ROGAN
*Director of the United States Patent and Trademark Office*